United States Patent
Saberi et al.

(10) Patent No.: US 8,444,734 B2
(45) Date of Patent: May 21, 2013

(54) APPARATUS FOR THE SEPARATION OF PARTICLES CONTAINED IN EXHAUST GASES OF INTERNAL COMBUSTION ENGINES

(75) Inventors: Shadi Saberi, Oakville (CA);
Alexander Böhm, Hähnichen (DE);
Dirk Naumann, Mississauga (CA);
Lloyd Timberg, Burlington (CA)

(73) Assignee: Alantum Corporation, Seongnam (KR)

( * ) Notice: Subject to any disclaimer, the term of this patent is extended or adjusted under 35 U.S.C. 154(b) by 855 days.

(21) Appl. No.: 12/278,926

(22) PCT Filed: Feb. 15, 2007

(86) PCT No.: PCT/EP2007/001327
§ 371 (c)(1),
(2), (4) Date: Dec. 31, 2008

(87) PCT Pub. No.: WO2007/096085
PCT Pub. Date: Aug. 30, 2007

(65) Prior Publication Data
US 2009/0185962 A1 Jul. 23, 2009

(30) Foreign Application Priority Data
Feb. 20, 2006 (DE) .......................... 10 2006 009 164

(51) Int. Cl.
*B01D 46/00* (2006.01)
*B01D 53/92* (2006.01)
(52) U.S. Cl.
USPC ................ 55/487; 55/385.3; 55/523; 55/525; 422/169; 422/180

(58) Field of Classification Search
USPC ................ 422/169, 177, 180; 55/385.3, 487, 55/523, 525
See application file for complete search history.

(56) References Cited

U.S. PATENT DOCUMENTS 5,908,480 A * 6/1999 Ban et al. .......................... 55/482
6,080,219 A 6/2000 Jha et al.
(Continued)

FOREIGN PATENT DOCUMENTS

CN 1087024 5/1994
DE 4141580 6/1993
(Continued)

*Primary Examiner* — Jill Warden
*Assistant Examiner* — Joye L. Woodard
(74) *Attorney, Agent, or Firm* — Lexyoume IP Meister, PLLC.

(57) ABSTRACT

The invention relates to an apparatus for the separation of particles contained in exhaust gases of internal combustion engines in which the exhaust gas flow is guided through a filter medium in which particles can be absorbed and held back. The invention should improve the separation in a cost effective manner with respect to conventional particle filters. In accordance with the invention, the filter medium (1) is made from a metal open-pore foam having at least two layers (1.1, 1.2, 1.3) which each have a thickness, porosity and/or pore size in the flowthrough direction through the filter medium which differ from one another. In one embodiment, the particle filter includes first and second filter medium layers where the first filter medium has a mean pore size larger than a mean pore size of the second filter medium, and the first filter medium has a thickness that increases in a direction of the exhaust gas flow inlet passage of the filter housing.

12 Claims, 8 Drawing Sheets

U.S. PATENT DOCUMENTS

| | | | |
|---|---|---|---|
| 6,991,668 B2 * | 1/2006 | Towsley | 55/525 |
| 7,566,425 B2 * | 7/2009 | Zuberi | 422/180 |
| 2005/0056977 A1 | 3/2005 | Figoutz et al. | |
| 2006/0078479 A1 * | 4/2006 | Panov et al. | 422/177 |
| 2006/0120937 A1 * | 6/2006 | Zuberi | 423/215.5 |

FOREIGN PATENT DOCUMENTS

| | | |
|---|---|---|
| EP | 0532986 | 3/1993 |
| EP | 1317950 | 6/2003 |
| EP | 1507072 | 2/2005 |
| EP | 1515012 | 3/2005 |
| EP | 1719553 | 11/2006 |
| JP | 57-010319 | 1/1982 |
| JP | 05-066506 A | 3/1993 |
| JP | 06-505785 A | 6/1994 |
| JP | 06-235311 A | 8/1994 |
| JP | 07-038611 A | 2/1995 |
| JP | 09-049420 A | 2/1997 |
| JP | 2001-082127 A | 3/2001 |
| JP | 2002-058939 A | 2/2002 |
| JP | 2002-221020 A | 8/2002 |
| WO | 2007052084 | 5/2007 |

* cited by examiner

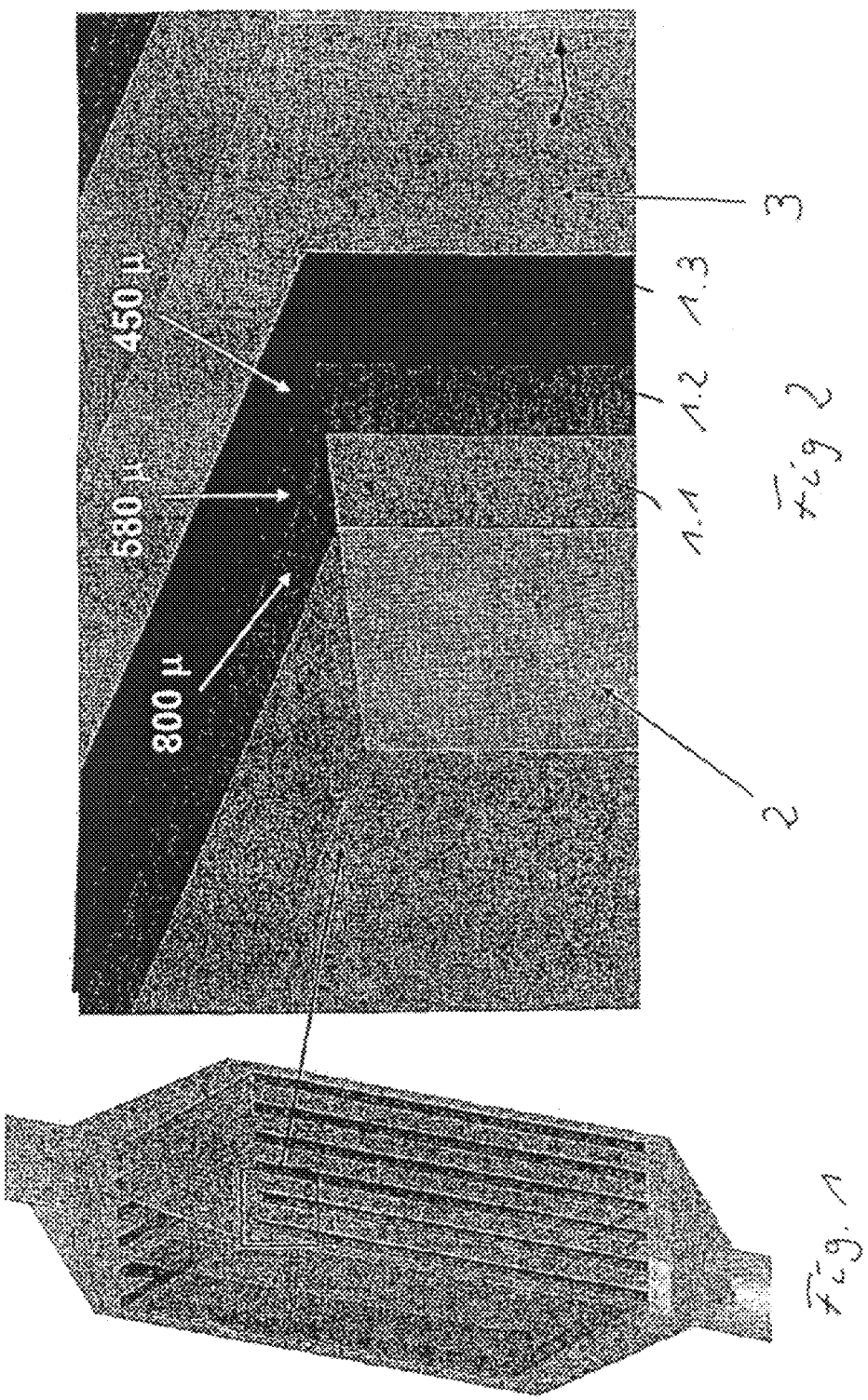

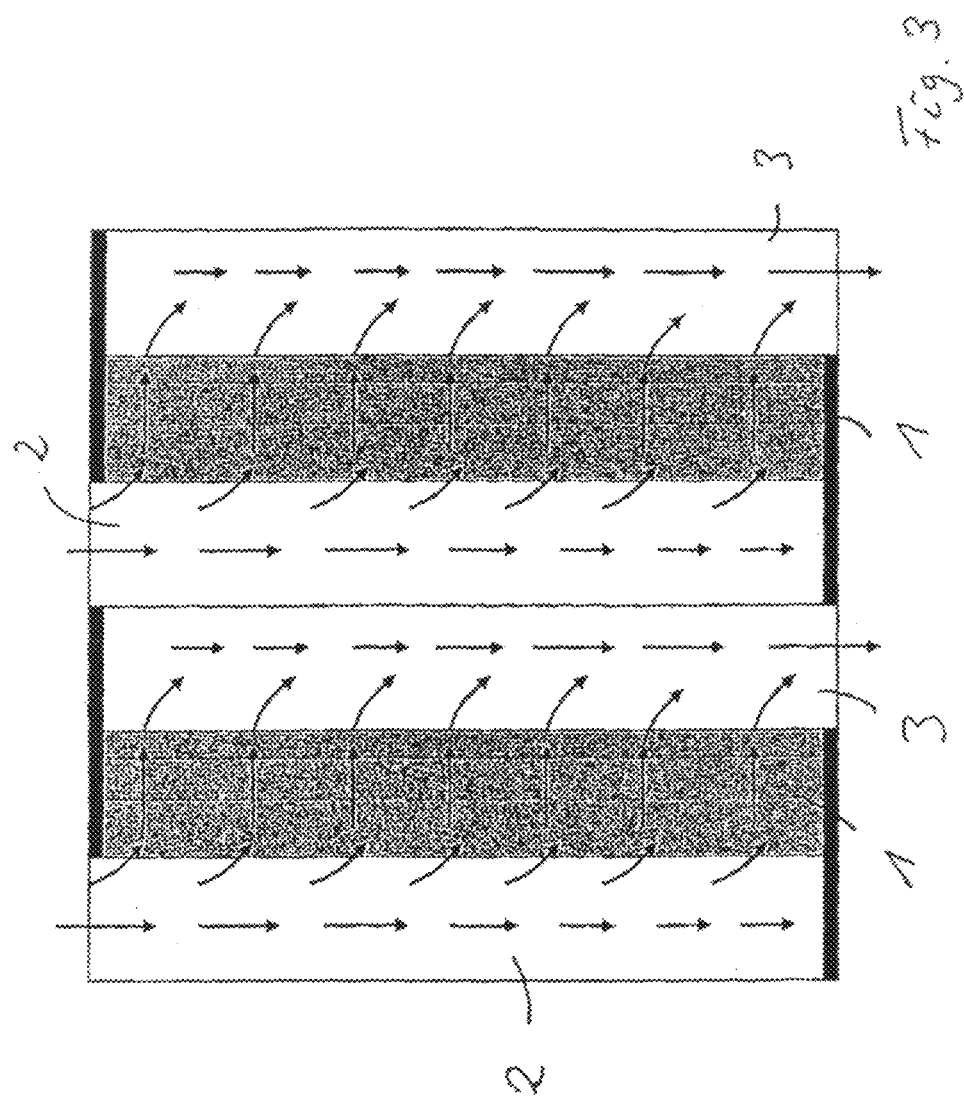

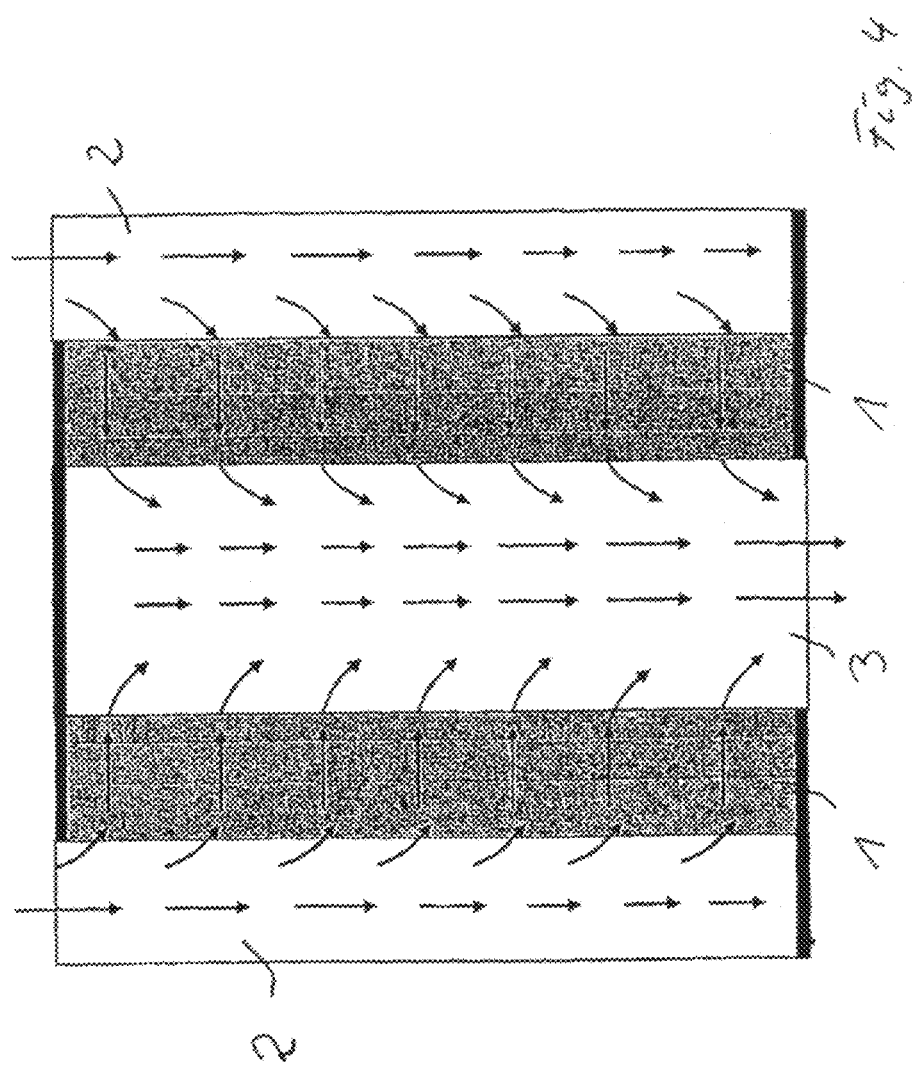

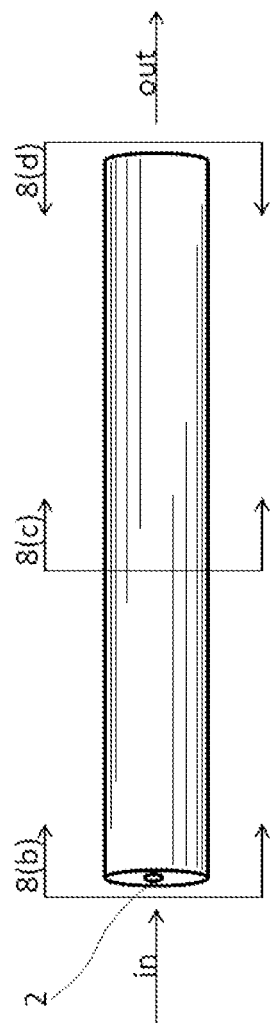
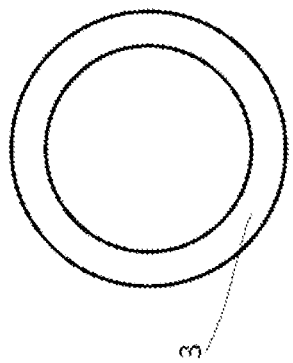
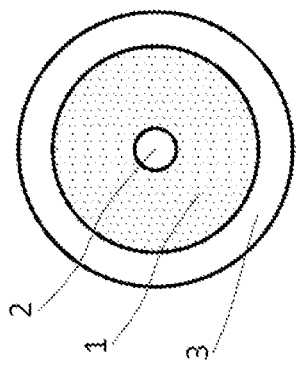
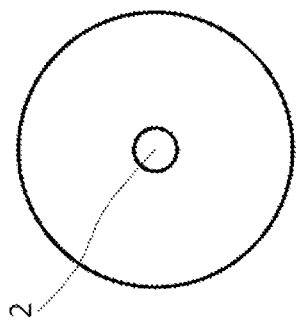

APPARATUS FOR THE SEPARATION OF PARTICLES CONTAINED IN EXHAUST GASES OF INTERNAL COMBUSTION ENGINES

PRIORITY

This application claims priority to German Patent Application Number Application Number 10 2006 009 164.7, filed 20 Feb. 2006, and PCT/EP2007/001327 filed 15 Feb. 2007, the entire disclosure of each of which is incorporated herein by reference.

FIELD OF THE INVENTION

The invention relates to an apparatus for the separation of particles contained in exhaust gases of internal combustion engines, said apparatus also usually being called a diesel particulate filter.

BACKGROUND OF THE INVENTION

For these applications, predominantly those apparatus have previously been used in which the separation is carried out using ceramic members, preferably made of silicon carbide. These ceramic materials are admittedly well suited for a high-temperature use, but have some substantial disadvantages due to the material. This relates, on the one hand, to the large inherent mass to be recorded as a result of the relatively high density which in particular has a fuel consumption increasing effect on mobile use in vehicles. Ceramic materials are moreover brittle and prone to destruction or damage in cases of oscillating alternating load.

A further disadvantage results due to a thermal expansion which differs substantially from metals usually used for the housings and which can only be compensated with increased effort and/or expenditure.

Further known solutions use fiber structures. The latter require properties which increase the manufacturing costs. For instance, in addition to temperature resistance, fiber structures must also achieve a sufficient long-term separation capability. Such fiber structures, however, also do not have any sufficiently high strength without additional measures.

A further possibility known per se is the use of particles which are used in bulk or in a local composite of the individual particles. The inherent strength is also not sufficiently present here.

OBJECT OF THE INVENTION

It is therefore the object of the invention to improve the separation of particles contained in exhaust gases of internal combustion engines in a cost-effective manner.

SUMMARY OF THE INVENTION

In the apparatus in accordance with the invention, exhaust gas of an internal combustion engine containing particles is guided through a filter medium. The filter medium is made of an open-pore metal foam and is made, in this connection of at least two layers of such a foam. The thickness, the porosity and/or the mean pore size of the individual layers differ. For instance, the layer first flowed through by exhaust gas containing particles will have a larger thickness, a larger porosity and/or a larger mean pore size than the layer(s) subsequently flowed through by exhaust gas. If more than two layers form a filter medium, the respective layer thickness, the porosity and/or the mean pore size reduce in size successively in the direction of flow.

The exhaust gas containing particles can be introduced into the apparatus via at least one inlet passage and be discharged via at least one outlet passage after flowing through a filter medium.

The open-pore foam forming the layers for the filter medium can preferably be made using nickel, iron or a nickel alloy or iron alloy, with in particular chromium, and optionally further alloys containing alloy elements comprising advantageous properties. Such nickel alloys should preferably be used.

As far as possible, three layers, but a maximum of ten layers, of such an open-pore metal foam should form a filter medium for a good separation capability. The layers should, as far as possible, be in touching contact with one another and hollow spaces between the individual layers should be avoided as far as possible. For this purpose, the layers forming the filter medium can be connected to one another at the outer edge which can anyway not be used for the separation. The connection can be limited to diametrically opposed end faces.

The layers forming the filter medium should have a total thickness of at least 1.5 mm.

In this connection, the layer first flowed through by exhaust gas containing particles should have at least a mean pore size of 200 μm.

It should make up at least 40% of the total layer thickness of the filter medium formed from the layers.

A second layer flowed through after this should have a mean pore size which is at least 100 μm smaller than the layer first flowed through.

A third layer, flowed through by exhaust gas last, should have a mean pore size which is in turn at least 100 μm smaller than that the layer arranged before it has.

The filter medium formed from the layers can be configured in plate shape with a planar surface.

It can, however, also be configured in tubular form and form a hollow cylinder. An example embodiment of this tubular configuration is illustrated in FIGS. 8(a) through 8(d). In this case, the interior can form an inlet passage or also an outlet passage. More than one outlet passage or inlet passage can also be formed radially outwardly or also inwardly by corresponding partition walls. With such an embodiment, no rotational symmetry has to be observed. Different cross-sectional geometries such as square or rectangular shapes can also be selected and thus a matching to desired installation conditions, for example in a motor vehicle, can be taken into account.

A filter medium formed from a plurality of layers can also be wound around a longitudinal axis in a spiral shape.

The filter medium and the inlet and outlet passages can be made in U shape and in this connection exhaust gas can also flow along in U shape through an apparatus made in this manner, with exhaust gas also flowing successively through the filter medium from an inlet passage into an outlet passage while flowing through.

The inflow direction of exhaust gas containing particles into an inlet passage can be aligned parallel to the surface of a layer first flowed through by exhaust gas. The oppositely disposed front side end of such an inlet passage can then be closed so that the whole exhaust gas volume has to flow through the filter medium and can be discharged to ambient free of particles via an outlet passage after this flowing through. In this connection, the whole length of the filter medium along an inlet passage with the corresponding surface of the filter medium flowed through by exhaust gas containing particles is available for the separation. In this context, free of particles should be understood such that at least preset statutory provisions are observed.

It can be advantageous to reduce the free cross-section of an inlet passage in the direction with which exhaust gas containing particles flows into the inlet passage. On the flowing of the exhaust gas containing particles through the inlet passage, its flow speed thereby increases as the free cross-section reduces, which results in an improved separation of particles. The reduction in the free cross-section of an inlet passage in the direction of flow can be made continuous in this connection. The flow speed of the exhaust gas containing particles in the inlet passage can thus be approximately doubled starting from the entry into the inlet passage up to and into the proximity of the oppositely disposed front face end of the inlet passage.

This can be achieved by a corresponding configuration of a housing with which the one or more inlet passage(s) can also be formed. However, a corresponding partition wall can also be interposed which brings about this effect.

A further possibility consists of enlarging the total layer thickness of a filter medium in the inflow direction of the exhaust gas containing particles so that the free cross-section can thereby be reduced and the flow speed can be increased. An example embodiment of this configuration is illustrated in FIG. 9. In this connection, only the layer first flowed through by the exhaust gas containing particles can become thicker in this direction.

The filter medium can, however, also be configured such that at least one of the layers has a porosity and/or mean pore size varying in graduated form. This should take place such that it reduces from the front to the rear in the inflow direction.

Such an embodiment can be combined with a previously explained one in which one or more inlet passages with a reduced cross-section are present.

In addition, the surface of the open-pore metal foam can be provided with a coating at least regionally. For instance, only the surface facing outwardly in the direction of the inlet passage of the layer first flowed through by the exhaust gas containing particles can, for example, be coated.

With a coating, an enlarging of the specific surface of the layer(s) and/or a catalytic effect can be achieved, which can result in an increase of the separation capability for particles or in an improvement of the quality of the exhaust gas discharged to ambient.

BRIEF DESCRIPTION OF THE DRAWINGS

The invention should be explained in more detail with reference to examples in the following.

There are shown:

In FIG. 1, a perspective schematic representation of an example of an apparatus in accordance with the invention having a plurality of inlet and outlet passages aligned parallel to one another as well as filter media;

In FIG. 2, an enlarged section of an apparatus in accordance with example 1;

FIG. 3, an example having two inlet and outlet passages as well as filter media in each case;

In FIG. 4, an example having two separate inlet passages via which exhaust gas containing particles flows in and through two filter media and is discharged via a common outlet passage;

In addition, FIG. 8(*a*) schematically illustrates an example embodiment wherein the filter apparatus has a tubular form. FIGS. 8(*b*), 8(*c*) and 8(*d*) are cross-sectional views of the apparatus illustrated in FIG. 8(*a*) taken at sections 8(*b*), 8(*c*) and 8(*d*), respectively. As described below, the filter medium 1 optionally includes layers 1.1, 1.2 and 1.3.

Figure 9:
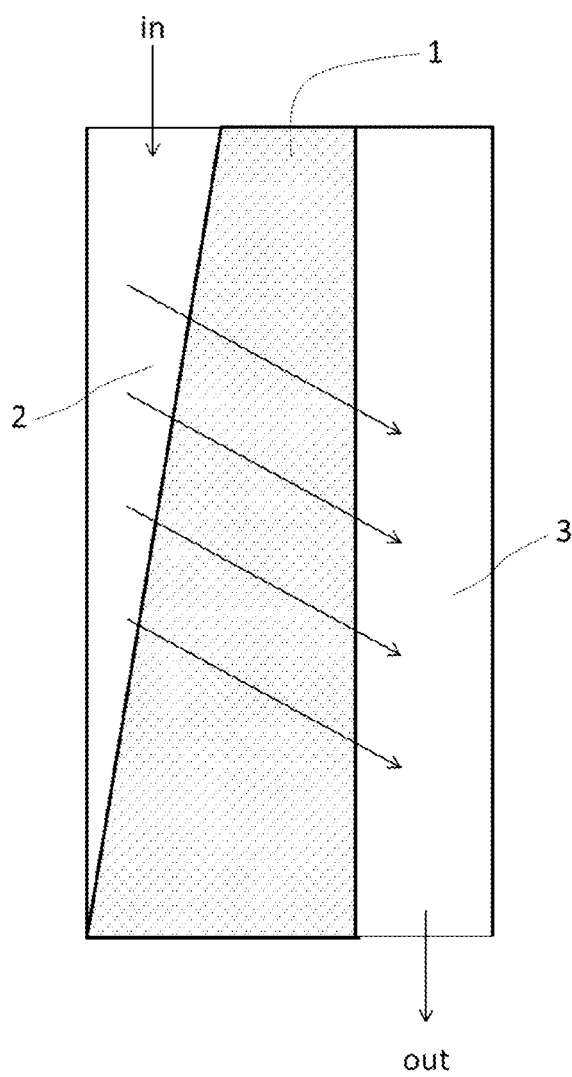

Finally, FIG. 9 schematically illustrates an example embodiment wherein the total layer thickness of the filter medium 1 is enlarged in the inflow direction, such that the free cross-section of the inlet passage 2 is reduced and the flow speed of the exhaust gas can be increased. As described below, the filter medium 1 optionally includes layers 1.1, 1.2 and 1.3.

DETAILED DESCRIPTION OF THE DRAWINGS

In FIG. 1, an example of an apparatus in accordance with the invention is shown in which exhaust gas is introduced via connection pipes and is also discharged to ambient again. The effective part with a plurality of inlet passages 2 and outlet passages 3, which are each separated from one another by means of a filter medium, is disposed therebetween. The exhaust gas containing particles can flow into the individual inlet passages, then flow through the individual filter media 1 and be discharged via outlet passages 3. The inlet and outlet passages 2 and 3 as well as the filter media 1 are aligned parallel to one another and the whole has a square or rectangular cross-section. The inlet passages 2 and the outlet passages 3 are closed mutually at their end faces to discharge the exhaust gas flow through the filter media 1 and out of the outlet passages 3.

A structure of a filter medium, which is made with three layers 1.1; 1.2; and 1.3, is illustrated with an enlarged detail of FIG. 1 such as is shown in FIG. 2. The layers 1.1; 1.2; and 1.3 are made from an open-pore foam comprising a nickel alloy.

The layer 1.1. first flowed through in the direction of an inlet passage 2, that is first flowed through by exhaust gas containing particles, has a mean pore size of 0.8 mm.

The second layer 1.2 has a mean pore size of 0.58 mm. The layer 1.3 of a filter medium 1 arranged in the direction of an outlet passage 3 has a mean pore size of 0.45 mm.

The FIG. 3 illustrates a possibility having in each case two inlet and outlet passages 2 and 3 which are in turn separately divided from one another by a filter medium 1 through which exhaust gas flows for the separation of particles. It becomes clear in this context how the flow of the exhaust gas is directed and how end-face mutually oppositely disposed ends of inlet and outlet passages 2 and 3 are closed in a gas-tight manner.

FIG. 4 shows an example having two inlet passages 2 for exhaust gas containing particles which flows through a filter medium 1 in each case and then particle free exhaust gas is discharged to ambient via a common outlet passage 3.

Figure 5:
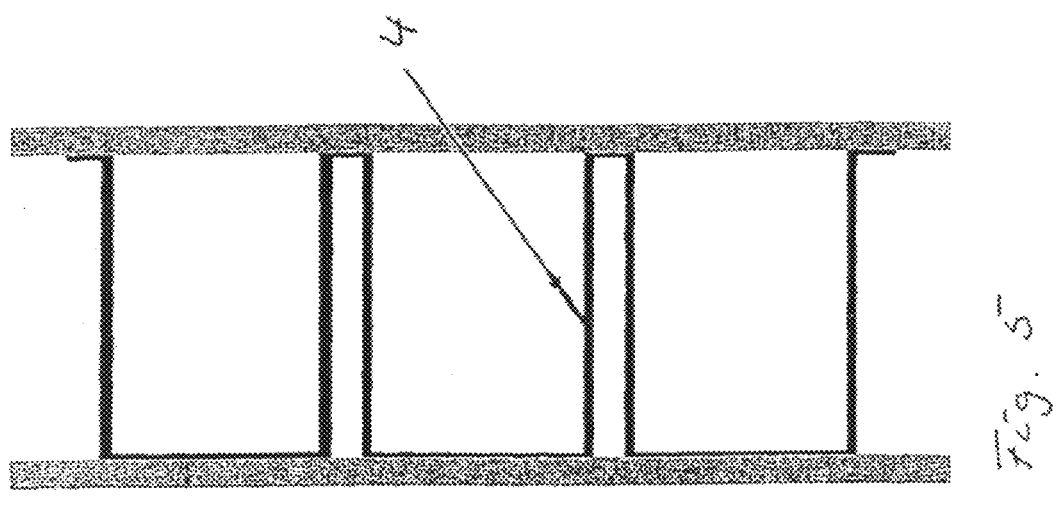
In FIG. 5, an example having a support structure.

A possibility is shown in schematic form in FIG. 5 for an increase in the stability or also strength by means of a support structure 4. Such a support structure can be connected in a firmly bonded manner to a filter medium 1 of a housing wall or to the wall of an inlet or outlet passage 2 or 3. This can be achieved using webs or metal sheets which can form a support structure 4. In this connection, the spacing of individual components to one another can be observed in the long term on an apparatus in accordance with the invention. A support structure 4 should, however, be configured, arranged and dimensioned such that the flow relationships for the exhaust gas are not disadvantageously influenced.

Figure 6:
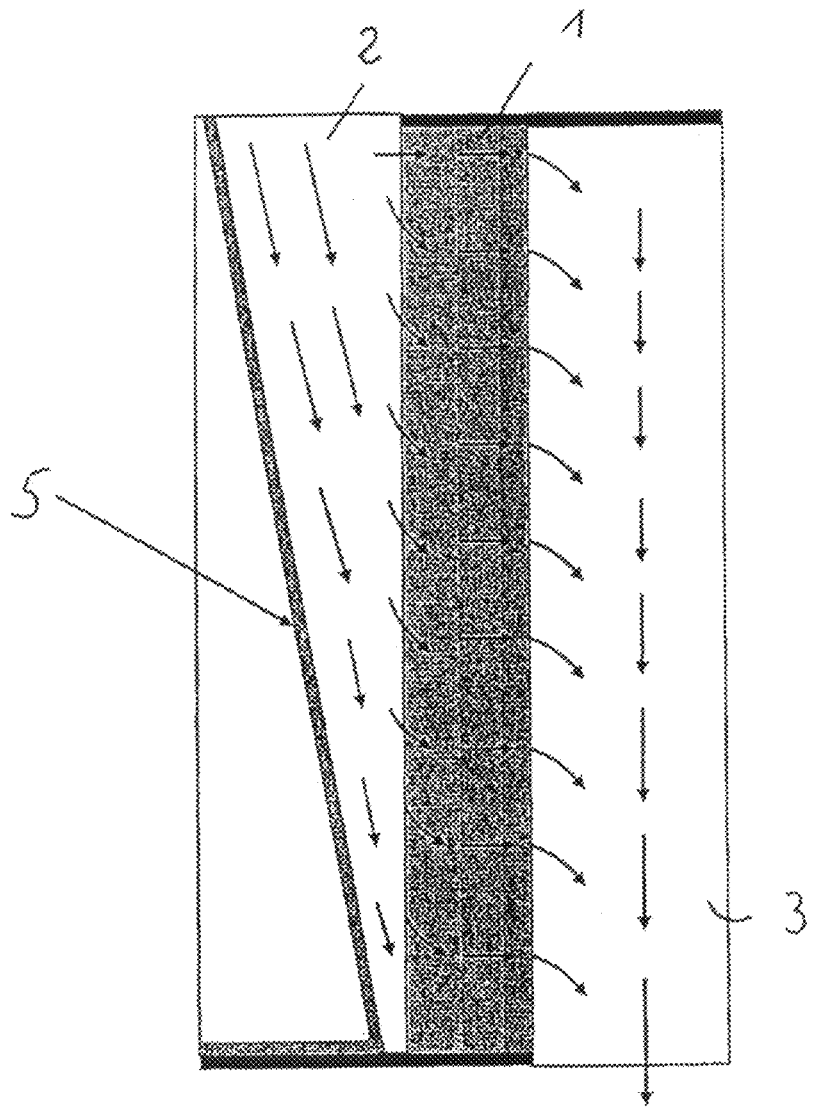
In FIG. 6, in schematic form, an example having an inlet passage whose free cross-section is reduced; and In FIG. 7, in schematic form, an embodiment having a graduated porosity or a mean pore size at a filter medium.

In FIG. 6, an example is shown having a free cross-section of an inlet passage 2 tapering conically in the inflow direction of exhaust gas containing particles.

Accordingly, the flow speed of the exhaust gas containing particles can be increased on the throughflow of the inlet passage 1 starting from the entry into the inlet passage 2 up to and into the proximity of the oppositely disposed end of the inlet passage 2. The damming effect of the end face of the inlet passage 2 closed in a gas tight manner acts shortly before the front face end and the flow speed is lower again there.

The reduction in size of the free cross-section of an inlet passage 2 is indicated schematically here by an additional partition wall 5.

Figure 7:
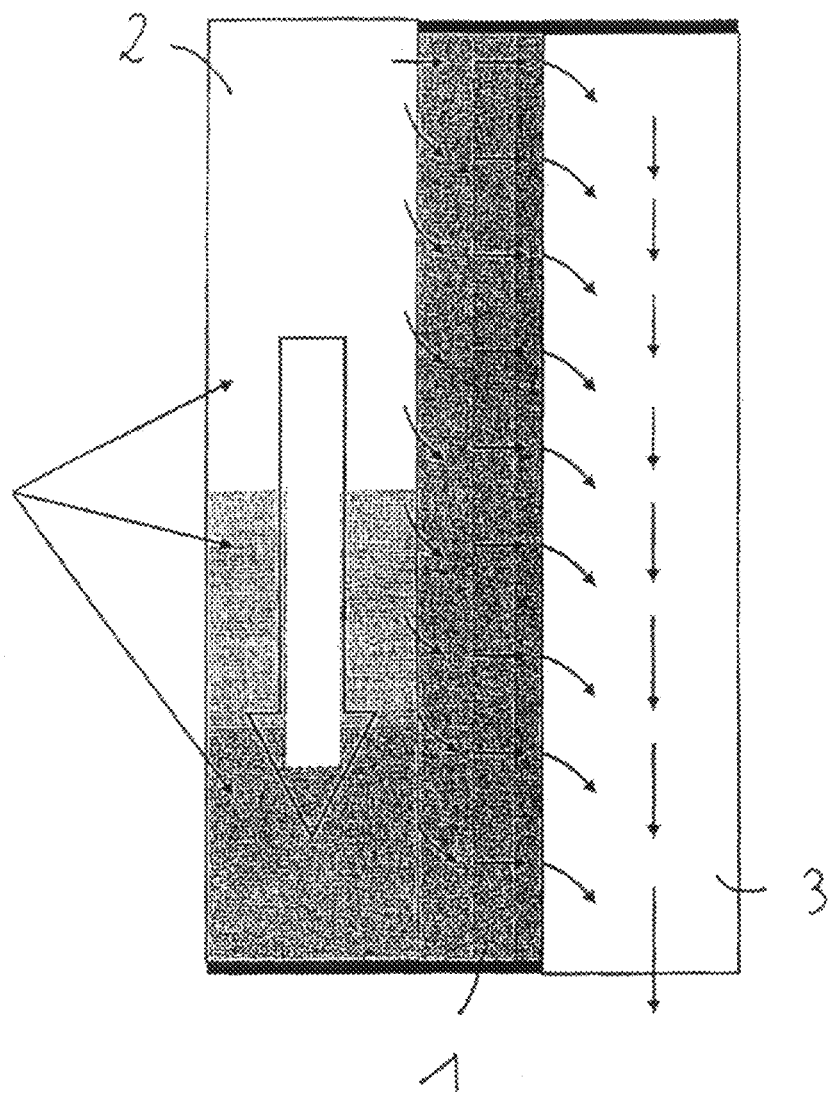

FIG. 7 shows an example in which a filter medium 1 configured in graduated shape has been selected in the direction of the exhaust gas containing particles flowing into an inlet passage 2. In this connection, the porosity and mean pore size at the filter medium 1 reduce in size in this direction so that the flow resistance for the exhaust gas flowing through the filter medium 1 increases in the direction of the end of the inlet passage 2. This can result in a homogenization of the flow of the exhaust gas containing particles in the inlet passage 2.

Only one region of the filter medium 1 can also be provided with a coating in such an embodiment, said coating in turn also being able to be catalytically effective.

The invention claimed is:

1. A filter apparatus comprising:
a housing;
a first filter medium positioned within the housing such that a hollow inlet passage configured to receive an incoming flow of exhaust gas is located between the first filter medium and the housing, the first filter medium comprising a first open-pore metal foam body and including an inlet side that defines one side of the hollow inlet passage, such that the incoming flow of exhaust gas in the hollow inlet passage flows parallel to, and is received into, the inlet side of the first filter medium; and
a second filter medium positioned within the housing such that a hollow outlet passage configured to receive an outgoing flow of filtered exhaust gas is located between the second filter medium and the housing, wherein the second filter medium (a) comprises a second open-pore metal foam body, (b) abuts the first filter medium, and (c) includes an outlet side that defines one side of the hollow outlet passage, such that the outgoing flow of filtered exhaust gas passes from the outlet side of the second filter medium and into the hollow outlet passage, where it flows parallel to the outlet side of the second filter medium;
wherein the first and second filter media are positioned between the hollow inlet and outlet passages;
wherein the second open-pore metal foam body has a mean pore size that is smaller than a mean pore size of the first open-pore metal foam body; and
wherein the first filter medium has a thickness that increases in a direction of exhaust gas flow in the hollow inlet passage.

2. The filter apparatus of claim 1, wherein the first and second open-pore metal foam bodies are selected from the group consisting of nickel, iron and nickel-iron alloys.

3. The filter apparatus of claim 1, wherein the mean pore size of the first open-pore metal foam body is at least 200 µm.

4. The filter apparatus of claim 1, wherein the first and second filter media have a composite thickness of at least 1.5 mm.

5. The filter apparatus of claim 1, wherein the first and second filter media have a planar shape.

6. The filter apparatus of claim 1, wherein the first and second filter media have a hollow tubular shape.

7. The filter apparatus of claim 1, wherein the hollow inlet passage has a cross-sectional area that decreases in a direction of the incoming flow of exhaust gas.

8. The filter apparatus of claim 1, wherein the mean pore size of the first open-pore metal foam body is variable, with relatively larger pores located upstream of relatively smaller pores.

9. The filter apparatus of claim 1, wherein at least a portion of the inlet side of the first filter medium includes a catalytic coating.

10. The filter apparatus of claim 1, wherein the mean pore size of the second open-pore metal foam body is at least 100 µm smaller than the mean pore size of the first open-pore metal foam body.

11. The filter apparatus of claim 1, wherein the first filter medium has a thickness that is at least 40% of a combined thickness of the first and second filter media.

12. The filter apparatus of claim 1, wherein no catalyst is positioned downstream of the inlet side of the first filter medium.

* * * * *